(12) United States Patent
Pfund

(10) Patent No.: US 7,658,261 B2
(45) Date of Patent: Feb. 9, 2010

(54) DRIVE TRAIN FOR A MOTOR VEHICLE AND METHOD FOR OPERATING SUCH A DRIVE TRAIN

(75) Inventor: Thomas Pfund, Leiberstung (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 561 days.

(21) Appl. No.: 11/542,763

(22) Filed: Oct. 4, 2006

(65) Prior Publication Data

US 2007/0080004 A1    Apr. 12, 2007

(30) Foreign Application Priority Data

Oct. 11, 2005    (DE) .................. 10 2005 048 612

(51) Int. Cl.
- *F16H 59/00* (2006.01)
- *B60W 10/02* (2006.01)
- *B60W 10/04* (2006.01)
- *B60W 10/00* (2006.01)

(52) U.S. Cl. .............. 180/338; 477/175; 477/179; 477/98; 180/292; 180/293; 180/294; 180/339

(58) Field of Classification Search ........... 180/292, 180/293, 294, 338, 339; 477/76, 77, 78, 477/98, 174, 175, 176, 179, 180
See application file for complete search history.

(56) References Cited

U.S. PATENT DOCUMENTS

| | | | |
|---|---|---|---|
| 2,918,154 A * | 12/1959 | Forster et al. ............ 477/174 |
| 4,669,591 A * | 6/1987 | Sakakiyama .............. 477/176 |
| 4,823,925 A * | 4/1989 | Ohkumo et al. ............ 477/39 |
| 4,829,221 A | 5/1989 | Grunberg et al. |
| 4,880,094 A * | 11/1989 | Ohkumo .................. 477/176 |
| 5,941,923 A | 8/1999 | Fischer et al. |
| 6,033,342 A | 3/2000 | Steinel et al. |
| 6,171,212 B1 * | 1/2001 | Reuschel ................. 477/86 |
| 6,463,375 B2 * | 10/2002 | Matsubara et al. .......... 701/54 |
| 6,482,123 B2 * | 11/2002 | Steeby ................... 477/98 |
| 6,647,333 B2 * | 11/2003 | Jager et al. .............. 701/51 |
| 2002/0045516 A1 * | 4/2002 | Nakashima ............... 477/174 |
| 2002/0096414 A1 * | 7/2002 | Miyamoto ............... 192/3.56 |
| 2005/0101438 A1 * | 5/2005 | Cring ................... 477/174 |

FOREIGN PATENT DOCUMENTS

| DE | 197 01 671 | 7/1998 |
|---|---|---|
| DE | 198 06 497 | 8/1999 |
| DE | 103 12 088 | 9/2004 |

* cited by examiner

*Primary Examiner*—Paul N Dickson
*Assistant Examiner*—John R Olszewski
(74) *Attorney, Agent, or Firm*—Simpson & Simpson, PLLC

(57) ABSTRACT

In a method for operating a drive train for a motor vehicle, a torque is produced by means of an internal combustion engine as a function of an available torque set value signal and transmitted to drive wheels by means of a clutch. With the help of an electric motor, a closing force is applied, with which the clutch is held in a closed position against a restoring force. The electric motor is energized in such a way that a high current is used in the case of a high torque and a lower current is used in the case of a lower torque. The thermal load of the electric motor is determined and a load signal corresponding to the thermal load is produced. The load signal is compared with a load limit signal assigned to a permissible load range. If the load signal deviates from the load-limit signal, the torque of the internal combustion engine is limited.

9 Claims, 1 Drawing Sheet

DRIVE TRAIN FOR A MOTOR VEHICLE AND METHOD FOR OPERATING SUCH A DRIVE TRAIN

CROSS REFERENCE TO RELATED APPLICATIONS

This patent application claims priority of German Patent Application No. 10 2005 048 612.6, filed Oct. 11, 2005, which application is incorporated herein by reference.

FIELD OF THE INVENTION

The invention relates to a method for operating a drive train for a motor vehicle, wherein a torque is produced by means of an internal combustion engine as a function of an available torque set value signal and transferred to the drive wheels using a clutch, wherein with the help of an electric motor, a closing force is applied using which the clutch is held against a restoring force in a closed position, wherein the electric motor is energized in such a way that high current is used in the case of a high torque, and low current is used in the case of a low torque. The invention further relates to a drive train for a motor vehicle, said drive train comprising an internal combustion engine, which is connected to an electronic engine control and which has a drive connection to the drive wheels by means of a clutch, wherein the clutch is designed as a self-opening clutch, which can be brought from an open position to a closed position against a restoring force with the help of a clutch actuator comprising an electric motor as an adjustment drive, wherein the clutch actuator comprises a trigger device for the electric motor, said trigger device being connected for adjusting the actuating force of the clutch actuator as a function of the torque of the internal combustion engine to the engine control unit, wherein the engine control unit comprises a set value signal input for a torque set value signal and a limit value signal input for a torque limit value signal, and wherein the engine control unit is designed in such a way that the torque of the internal combustion engine corresponding to the torque set value signal is adjusted, if said torque is within a torque value range predetermined by the torque limit value signal, and that the torque of the internal combustion engine is limited to the torque range if the torque corresponding to the torque set value signal is located outside the torque value range.

BACKGROUND OF THE INVENTION

Such a drive train, which comprises an internal combustion engine that drives the drive wheels of the motor vehicle using a clutch and a manual gearbox, is known from practical experience. Here, the internal combustion engine is in control connection with an engine control unit, which adjusts the torque of the internal combustion engine corresponding to a torque set value signal preset at a set value signal input of the engine control unit. The torque set value signal can be predetermined directly by the driver using an electronic accelerator or by an electronic travel-stabilizing device. The manual gearbox is arranged in the drive train between the clutch and the drive wheels and its gear transmission ratio can be adjusted with the help of a motor-driven actuating device. The manual gearbox and the actuating device have a drive connection to an electronic transmission control system, which comprises a limit value signal output using which a limit value signal is output to the engine control unit in order to limit the torque of the internal combustion engine during the shifting operations. The shifting operations can thus be carried out such that they are largely unnoticed by the passengers of the vehicle.

The clutch is designed as a self-opening, not self-locking clutch, which is bent into a closed position by means of a clutch actuator against the restoring force of a plate spring. The clutch actuator has an electric motor as a drive, which is constantly energized when the clutch is closed, in order to apply the required closing force for the clutch. In order to keep the thermal power dissipation occurring in the motor winding as low as possible on average, the winding current is adjusted proportionally to the torque of the internal combustion engine, i.e., the winding current increases with the increasing torque. In the case of a low load of the internal combustion engine, this results in a corresponding lesser heating of the electric motor. The latter is dimensioned in such a way that a thermal overload of the electric motor is prevented in operating states occurring normally in practice. Nevertheless, under disadvantageous conditions, if e.g., in the case of high ambient temperatures, a long distance is covered continuously with maximum torque of the internal combustion engine, the permissible operating temperature of the electric motor is exceeded temporarily. This thermal load reduces the service life of the electric motor accordingly. This is disadvantageous especially since in the case of the breakdown of the electric motor, the clutch is arranged in the open position as a result of which the motor vehicle can no longer be moved by itself. The service life of the electric motor could indeed be increased by dimensioning it to be large enough so as to never be thermally overloaded even in the case of disadvantageous operating states occurring only seldom in practice. However, such an electric motor would be relatively large, correspondingly heavy and expensive.

A drive train for a motor vehicle is already disclosed in DE 198 06 497 C2, said drive train being foreign to the classification in question. In said drive train, the internal combustion engine drives the drive wheels using a conventionally designed frictional clutch. The frictional clutch can be adjusted with the help of an activation arrangement comprising a clutch pedal against the restoring force of a diaphragm spring from the open position into the closed position. By applying pressure on the clutch pedal, the driver of the motor vehicle can disengage the clutch, which is fully engaged in the resting state. The clutch has a clutch position sensor for detecting the closed position. Furthermore, slip sensors are provided for detecting the clutch slippage state. The clutch position sensor and the slip sensors are connected to a slip controller, which at the determination of a slippage state, limits a set value signal for the torque of the internal combustion engine, said set value signal being predetermined by the driver using an accelerator pedal. As stated in the patent specification, it is thus possible to dimension the frictional clutch and other components of the drive train to be lighter compared to a corresponding clutch without a slip controller. However, the disadvantage of the drive train is that the torque of the internal combustion engine is limited only after the clutch slippage has already occurred and the clutch can no longer transmit the required torque.

BRIEF SUMMARY OF THE INVENTION

It is therefore the object of the invention to provide a drive train of the type mentioned in the introduction, in which the clutch actuator can be produced cost-effectively with compact dimensions, in which the electric motor is nevertheless protected reliably from thermal overload even in disadvantageous operating states. Furthermore, the object underlying the invention is to specify a method for operating a drive train, in which method the electric motor is protected from thermal overload.

This object is attained with respect to the method by determining the thermal load of the electric motor and generating a load signal corresponding to the thermal load, by comparing the load signal with a load limit signal assigned to a permissible load range of the electric motor, and by limiting the torque of the internal combustion engine if the load signal deviates from the load limit signal.

In an imminent thermal overload of the electric motor, the torque of the internal combustion engine is thus reduced advantageously so as to reduce the clutch closing force to be applied by the electric motor and thus the thermal power dissipation in the electric motor. This counteracts the additional heating of the electric motor. The torque of the internal combustion engine can be reduced in such a way in the case of a corresponding dimensioning of the clutch actuator such that the driver practically does not notice it at all. Furthermore, since the maximum permissible thermal load of the electric motor is attained relatively rarely, the limitation or reduction of the torque of the internal combustion engine to be carried out once the load limit is reached affects the driving comfort or the acceleration of the motor vehicle only marginally. The reduction of the torque of the internal combustion engine can be carried out independently of any possibly existing slippage state of the clutch.

In an advantageous embodiment of the method, the thermal load of the electric motor is determined by a temperature measurement. The thermal load state of the electric motor can thus be detected relatively accurately and thus the operating temperature of the electric motor can be limited reliably to a maximum permissible value.

In another design form of the invention, a measurement signal for the electrical power dissipation of the electric motor is detected, wherein the load signal is determined from this measurement signal, an estimated value for an initial state and machine characteristics of the electric motor. The power dissipation can be calculated from signals, which are anyway present in the trigger device of the electric motor or which are known, such as e.g., the operating voltage of the electric motor and/or the pulse-to-pause ratio in an electric motor controlled by pulse width modulation. The estimated value for an initial state can be determined from empirical values, wherein a safety margin can be taken into account optionally. Thus for example, it can be assumed that the operating temperature of the electric motor amounts to below 50° C. if the internal combustion engine was switched off for a long period of time. Optionally it is also possible to determine the estimated value while taking into account at least one measurement value of at least one sensor of another component installed on the motor vehicle, such as e.g., the temperature measurement signal of an exterior thermometer, coolant thermometer, and/or gear oil thermometer, in order to improve the accuracy of the estimate. Starting from the estimated value, the temperature of the electric motor can be determined, for example, with the help of a microcomputer while taking into account the power dissipation of the electric motor and a heat flow model of the electric motor and/or of the adjacent components of the drive train.

It is advantageous if a shifting operation is activated for limiting the torque of the internal combustion engine, wherein the manual gearbox is shifted into a shifting position having a larger gear transmission ratio. The speed of the internal combustion engine thus increases, as a result of which the torque of the internal combustion engine and thus the actuating force to be applied by the electric motor is reduced accordingly if the power remains constant. The activation of a shifting operation is preferably carried out in the lower speed range of the internal combustion engine. Once the electric motor has cooled down, it may be possible, if necessary, to shift back into a shifting position having a smaller gear transmission ratio.

The afore-mentioned object is attained with respect to the drive train by providing the clutch actuator with a device for determining the thermal load of the electric motor. Said device comprises an output for a load signal corresponding to the load of the electric motor and an output for a load limit signal assigned to a permissible load range. These outputs are connected in such a way, using a linking device, to the limit value signal input of the engine control unit such that the torque of the internal combustion engine is limited when the load signal is outside the permissible load range.

A device for determining the thermal load of the electric motor thus transmits a load signal to the linking device, wherein said load signal is compared in the linking device with a load limit signal corresponding to the permissible load range of the electric motor. As a function of the result of the comparison, the torque of the internal combustion engine is then optionally limited and/or reduced in order to prevent a thermal overload of the electric motor from the outset.

In an advantageous embodiment of the invention, a manual gearbox is arranged between the clutch and the drive wheels. The gear transmission ratio of said manual gearbox can be adjusted with the help of an actuating device, wherein the manual gearbox and/or the actuating device comprises a limit value signal output, at which it is possible to output a limit value signal for limiting the torque of the internal combustion engine during a shifting operation, and wherein the limit value signal output is connected in such a way using the linking device to the limit value signal input of the engine control unit that the torque of the internal combustion engine is limited when the torque corresponding to the limit value signal is lower than the torque corresponding to the torque set value signal. The limit value signal input of the engine control unit then fulfills a double function, i.e., it is used for both improving the shifting comfort of the manual gearbox and also for protecting the electric motor of the clutch actuator from thermal overload.

In an expedient design form of the invention, the device for determining the thermal load of the electric motor comprises at least one temperature sensor. The thermal load state of the electric motor can thus be detected and monitored with great precision.

It is advantageous if the device for determining the thermal load of the electric motor comprises at least one input for a winding current signal of the electric motor, and if this input is connected to a computing device, which is designed for calculating an estimated value for the temperature of the electric motor from the winding current signal, characteristics of the coupling actuator and optionally a predetermined initial temperature, which the electric motor exhibits at the start of the energization of its winding. It is even possible to determine the thermal load of the electric motor without using a sensor, for example, when the winding current in a pulse width-modulated electric motor is calculated from the pulse-to-pause ratio and a known operating voltage of the electric motor.

In an advantageous embodiment of the invention, the drive train comprises two clutches, which form a double clutch, wherein the individual clutches are assigned to different input shafts of the manual gearbox and can be brought alternatively into the closed position, wherein each of the clutches is provided with a clutch actuator having an electric motor, a trigger device and a device for determining the thermal load of the electric motor, wherein these devices each have a status signal output for transmitting a status signal indicating a thermal overload of the related electric motor to the transmission control system, and wherein the transmission control system is designed in such a way that it activates a shifting operation if a signal indicating a thermal overload is present. In this shifting operation, the clutch for the electric motor of which the thermal overload is indicated, is opened and the respective other clutch is closed. In the case of an imminent thermal overload of an electric motor of a first clutch, a shifting operation is thus activated where a shift is made to the electric motor of the second clutch as long as this leads to a reliable operating state particularly of the manual gearbox, the internal combustion engine and the electric motors. Due to this the previously mentioned electric motor is relieved of the thermal load and can cool down.

BRIEF DESCRIPTION OF THE DRAWINGS

In the following, an exemplary embodiment of the invention is explained in more detail based on the drawing, wherein.

DETAILED DESCRIPTION OF THE INVENTION

Figure 1:
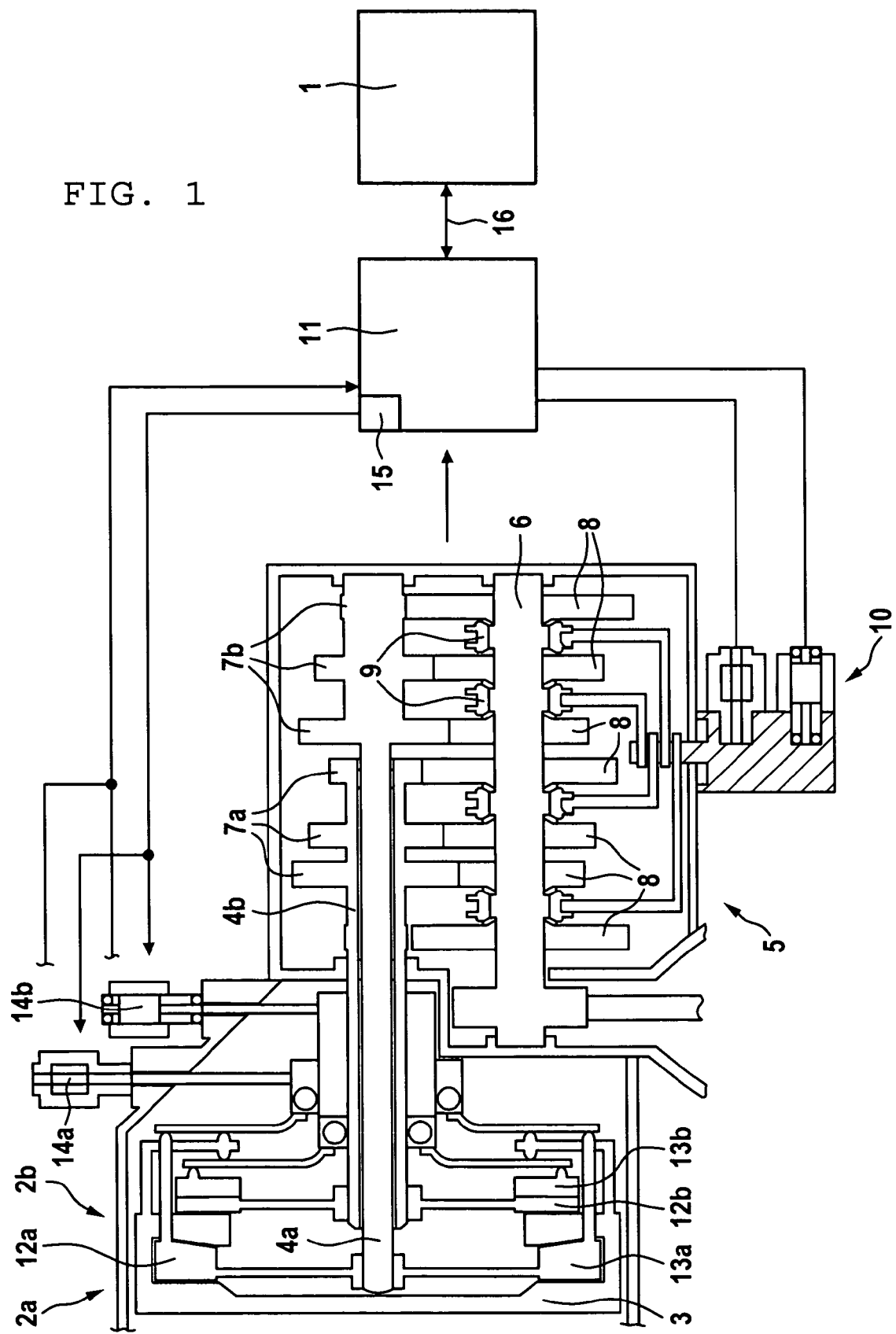
FIG. 1 is a schematic illustration of a drive train for a motor vehicle.

A drive train for a motor vehicle comprises an internal combustion engine known per se which is not illustrated in detail in the drawing. Said internal combustion engine is in control connection to an electronic engine control unit 1. The engine control unit has a set value signal input for a torque set value signal predetermined by the driver, for example, using an electronic accelerator pedal, by an automatic speed control unit, or by an electronic stability program. With the help of this engine control unit, the torque of the internal combustion engine is adjusted in a manner known per se as a function of the torque set value signal.

The drive train further has a double clutch device having two clutches 2a, 2b, which are not self-locking and which are connected non-rotatably on their input side to a flywheel mass 3 of the internal combustion engine and on their output side to respective input shafts 4a, 4b of a parallel shift gearbox, said input shafts being arranged coaxially to one another. An output shaft 6 of the parallel shift gearbox 5 drives the drive wheels (not illustrated in detail in the drawing) of the motor vehicle.

On each of the two input shafts 4a, 4b are arranged several first gear wheels 7a, 7b, which are offset in relation to one another in the axial direction of the input shafts 4a, 4b and which are connected non-rotatably to the input shafts 4a, 4b. The first gear wheels 7a, 7b each cooperate with matching second gear wheels 8, which are arranged on the output shaft 6 radially to the first gear wheels 7a, 7b assigned thereto. The second gear wheels 8 can be connected non-rotatably to the output shaft 6 for shifting different gears with the help of shifting elements 9. The shifting elements 9 can be adjusted for shifting the gears with the help of an actuating device 10. The actuating device 10 comprises transmission actuators, which are activated by a transmission control system 11.

Each clutch 2a, 2b has a clutch disk 12a, 12b having a friction lining, which can be clamped in a friction-fit between a contact surface of the flywheel mass 3 and a pressure disk 13a, 13b, said contact surface being assigned to the related clutch disk 12a, 12b. The pressure disks 13a, 13b each can move towards and away from the flywheel mass 3 in the axial direction.

To each clutch 2a, 2b, a clutch actuator having an electric motor 14a, 14b as an adjustment drive is assigned, with whose help the related clutch 2a, 2b can be displaced into an open position and a closed position. For driving the wheels, any of the two clutches 2a, 2b is in the closed position while the other clutch 2b, 2a is open, depending on which gear is engaged. In order to disengage the wheels from the internal combustion engine, both the clutches 2a, 2b can also be opened at the same time.

The two clutches 2a, 2b are each designed as self-opening clutches 2a, 2b, which are placed in the open position by the restoring force of a plate spring and are displaced into the closed position with the help of the electric motors 14a, 14b against the restoring force of the plate spring. During the closing duration of the clutch 2a, 2b, the electric motor 14a, 14b assigned to the clutch 2a, 2b is constantly energized with the help of a trigger device (not illustrated in the drawing).

By means of the trigger device, the actuating force of the clutch actuator assigned to the trigger device is adjusted somewhat proportionally to the torque of the internal combustion engine. An input of the trigger device is connected for this purpose to a torque signal output of the engine control unit 1. Accordingly low power dissipation thus occurs at the respective energized electric motor 14a, 14b in the case of a low torque of the internal combustion engine.

For each electric motor 14a, 14b, the trigger device comprises a device 15 for determining the thermal load of the electric motor 14a, 14b. The device 15 can comprise a temperature sensor and/or a microcontroller in which an operating program is stored, which determines the operating temperature of the electric motor 14a, 14b with the help of a model of the clutch actuator and provides a load signal at a first output. Said load signal represents a measure for the thermal load of the electric motor 14a, 14b. At a second output, the device 15 provides a load limit signal, which corresponds to a permissible thermal load range of the electric motor 14a, 14b. In the exemplary embodiment illustrated in the drawing, the device 15 is integrated in the transmission control system 11 comprising a microcomputer. The aforementioned outputs are linked to a limit value signal input of the engine control unit 1 using a linking arrangement, which is integrated in the transmission control system 11 and is not illustrated in the drawing and a bus system 16, such as e.g., a CAN bus. The linking arrangement and the engine control unit 1 are designed in such a way that the torque of the internal combustion engine is limited or reduced when the load signal is outside the permissible load range. Thus a thermal overload of the electric motor is prevented even under disadvantageous operating conditions.

The transmission control system 11 further comprises a limit value signal output, at which it is possible to output a limit value signal for limiting the torque of the internal combustion engine during a shifting operation. The limit value signal output is connected in such a way using the linking arrangement and the bus system 16 to the limit value signal input of the engine control unit such that the torque of the internal combustion engine is limited when the torque corresponding to the limit value signal is lower than the torque corresponding to the torque set value signal. This enables a largely smooth shifting of the gears.

At this juncture it should be mentioned that the invention is not limited to a clutch actuator or to the use thereof. Rather the invention can also be used in the case of other thermally loaded actuators, such as e.g., an actuator for positioning a valve for a reciprocating internal combustion engine.

LIST OF REFERENCE NUMERALS

1 Engine control unit
2a Clutch
2b Clutch
3 Flywheel mass
4a Inputshaft
4b Input shaft
5 Parallel shift gearbox
6 Output shaft
7a First gear wheel
7b First gear wheel
8 Second gear wheel
9 Shifting element
10 Actuating device
11 Transmission control system
12a Clutch disk
12b Clutch disk
13a Pressure disk
13b Pressure disk
14a Electric motor
14b Electric motor
15 Device for determining the thermal load
16 Bus system

What is claimed is:

1. A method for operating a drive train for a motor vehicle, wherein a torque is produced by means of an internal combustion engine as a function of a provided torque set value signal and transmitted using a clutch (2a, 2b) onto drive wheels, wherein a closing force is applied with the help of an electric motor (14a, 14b), the clutch (2a, 2b) being held using said closing force against a restoring force in a closed position, and wherein the electric motor (14a, 14b) is energized in such a way that a high current is used in the case of a high torque and a lower current is used in the case of a lower torque, said method comprising the steps of determining the thermal load of the electric motor (14a, 14b); generating a load signal corresponding to the thermal load; comparing the load signal with a load limit signal assigned to a permissible load range of the electric motor (14a, 14b); and limiting the torque of the internal combustion engine if the load signal deviates from the load limit signal.

2. The method according to claim 1 wherein the thermal load of the electric motor (14a, 14b) is determined by a temperature measurement.

3. The method according to claim 1 wherein a measurement signal for the electric power dissipation of the electric motor (14a, 14b) is detected and the load signal is determined from this measurement signal, an estimated value for an initial state and machine characteristics of the electric motor (14a, 14b).

4. The method according to claim 1 wherein a shifting operation is activated for limiting the torque of the internal combustion engine, the manual gearbox (5) being shifted in said shifting operation in a shifting position having a larger gear transmission ratio.

5. A drive train for a motor vehicle, said drive train comprising an internal combustion engine connected to an electronic engine control unit (1), said internal combustion engine having a drive connection to drive wheels using a clutch (2a, 2b), wherein the clutch (2a, 2b) is designed as a self-opening clutch (2a, 2b), which with the help of a clutch actuator comprising an electric motor (14a, 14b) as an adjustment drive, is operatively arranged to be brought against a restoring force from an open position into a closed position, wherein the clutch actuator comprises a trigger device for an electric motor (14a, 14b), said trigger device being connected to the engine control unit (1) for adjusting the actuating force of the clutch actuator as a function of the torque of the internal combustion engine, wherein the engine control unit (1) comprises a set value signal input for a torque set value signal and a limit value signal input for a torque limit value signal, and wherein the engine control unit (1) is designed in such a way that the torque of the internal combustion engine depending on the torque set value signal is adjusted, if said torque is within a torque value range predetermined by the torque limit value signal, and that the torque of the internal combustion engine is limited to the torque range if the torque corresponding to the torque set value signal lies outside the torque value range, said drive train being characterized in that a device (15) for determining the thermal load of the electric motor is provided to the coupling actuator, said device (15) comprising an output for a load signal corresponding to the load of the electric motor (14a, 14b) and an output for a load limit signal assigned to a permissible load range, and that these outputs are connected in such a way using a linking arrangement to the limit value signal input of the engine control unit (1), that the torque of the internal combustion engine is limited, when the load signal lies outside the permissible load range.

6. The drive train according to claim 5 wherein between the clutch (2a, 2b) and the drive wheels, a manual gearbox (5) is arranged, the gear transmission ratio of which is adjustable with the help of an actuating device (10), that the manual gearbox (5) and/or the actuating device (10) is connected to an electronic transmission control system (11), that the transmission control system (11) comprises a limit value signal output at which it is possible to output a limit value signal for limiting the torque of the internal combustion engine during a shifting operation, and that the limit value signal output is connected in such a way using the linking arrangement to the limit value signal input of the engine control unit (1) that the torque of the internal combustion engine is limited if the torque corresponding to the limit value signal is lower than the torque corresponding to the torque set value signal.

7. The drive train according to claim 5 wherein the device (15) for determining the thermal load of the electric motor (14a, 14b) comprises at least one temperature sensor.

8. The drive train according to claim 5 wherein the device (15) for determining the thermal load of the electric motor (14a, 14b) comprises at least one input for a winding current signal of the electric motor, and that this input is connected to a computing device, which is designed for calculating an estimated value for the temperature of the electric motor (14a, 14b) from the winding current signal, characteristics of the clutch actuator, and optionally a predetermined initial temperature, which the electric motor (14a, 14b) exhibits at the start of the energization of its coil.

9. The drive train according to claim 5 wherein said drive train comprises two clutches (2a, 2b), which form a double clutch, that the individual clutches (2a, 2b) are assigned to different input shafts (4a, 4b) of the manual gearbox (5) and can be brought alternatively in a closed position, that a clutch actuator having an electric motor (14a, 14b), a trigger device and a device (15) for determining the thermal load of the electric motor (14a, 14b) is provided for each of the clutches (2a, 2b), that this device (15) comprises a status signal output for transmitting a status signal indicating a thermal overload of the related electric motor to the transmission control unit (11), and that the transmission control unit (11) is designed in such a way that it activates a shifting operation if a status signal indicating a thermal overload is present, the clutch (2a, 2b) for the electric motor (14a, 14b) of which the thermal overload is indicated, being opened and the respective other clutch (2b, 2a) being closed in said shifting operation.

* * * * *